(12) United States Patent
Øllgaard

(10) Patent No.: US 10,330,088 B2
(45) Date of Patent: Jun. 25, 2019

(54) WIND TURBINE ACCESS PANEL AND METHOD FOR SECURING SAME

(71) Applicant: Vestas Wind Systems A/S, Aarhus N. (DK)

(72) Inventor: Børge Øllgaard, Esbjerg (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/547,666

(22) PCT Filed: Jan. 27, 2016

(86) PCT No.: PCT/DK2016/050019
§ 371 (c)(1),
(2) Date: Jul. 31, 2017

(87) PCT Pub. No.: WO2016/124200
PCT Pub. Date: Aug. 11, 2016

(65) Prior Publication Data
US 2018/0023548 A1 Jan. 25, 2018

(30) Foreign Application Priority Data
Feb. 2, 2015 (DK) ................................ 2015 70060

(51) Int. Cl.
*E06B 1/60* (2006.01)
*F03D 9/25* (2016.01)
(Continued)

(52) U.S. Cl.
CPC ............ *F03D 80/50* (2016.05); *E06B 1/6007* (2013.01); *F03D 9/257* (2017.02); *F03D 13/10* (2016.05);
(Continued)

(58) Field of Classification Search
CPC . F03D 11/04; E04H 12/08; E06B 7/32; E06B 2007/365
See application file for complete search history.

(56) References Cited

U.S. PATENT DOCUMENTS 3,987,596 A * 10/1976 Wolf ...................... B65D 90/54
52/196
4,254,960 A * 3/1981 Jelinek .................. B29C 43/021
277/644
(Continued)

FOREIGN PATENT DOCUMENTS

CN 201023021 Y 2/2008
DE 202004017080 U1 1/2005
(Continued)

OTHER PUBLICATIONS

Danish Patent and Trademark Office, Examination Report in PA 2015 70060, dated Sep. 14, 2015.
(Continued)

*Primary Examiner* — Paola Agudelo
(74) *Attorney, Agent, or Firm* — Wood Herron & Evans LLP

(57) ABSTRACT

The invention relates to an access panel configured for fixing to a service aperture in a wind turbine tower wall; wherein the access panel comprises a main panel and an adjacent sub-panel; the sub-panel comprising a bearing surface at an edge thereof; the main panel comprising a reference surface at an edge thereof; the main panel and the sub-panel being abuttable along a common seam; the seam comprising a said sub-panel bearing surface abutting a main panel reference surface; the main panel being dimensioned to close a main region of a tower wall aperture whereas the sub-panel is dimensioned to close a first sub-region of the aperture. The invention includes a method according to which the sub-panel is placed into a tower wall aperture and adjusted to
(Continued)

bring its bearing surface into a predetermined position. Thereafter, a main panel is placed in the aperture with its reference surface in abutment with the bearing surface, thereby quickly and easily and reliably locating the main panel for securely fixing in the tower aperture.

11 Claims, 9 Drawing Sheets

(51) Int. Cl.
  *F03D 80/50* (2016.01)
  *F03D 13/20* (2016.01)
  *F03D 13/10* (2016.01)

(52) U.S. Cl.
  CPC ............ *F03D 13/20* (2016.05); *F03D 13/22* (2016.05); *F05B 2240/912* (2013.01); *F05B 2240/95* (2013.01); *Y02E 10/725* (2013.01); *Y02E 10/727* (2013.01); *Y02E 10/728* (2013.01)

(56) References Cited

U.S. PATENT DOCUMENTS

| | | | | |
|---|---|---|---|---|
| 5,535,550 | A * | 7/1996 | Yang | E05B 65/1053 292/92 |
| 6,981,301 | B2 * | 1/2006 | Medina | E04F 21/0015 29/281.5 |
| 7,093,828 | B2 * | 8/2006 | Murray | B25B 5/067 269/3 |
| 9,416,511 | B2 * | 8/2016 | Kramer | F03D 80/50 |
| 2010/0135792 | A1 | 6/2010 | Niehues | |
| 2010/0244348 | A1 * | 9/2010 | Castor | B25B 5/067 269/165 |
| 2010/0308596 | A1 * | 12/2010 | Gawrisch | E04H 12/003 290/55 |
| 2011/0037270 | A1 | 2/2011 | Uphues et al. | |
| 2011/0219711 | A1 * | 9/2011 | Bagepalli | E04H 12/003 52/204.1 |
| 2011/0258952 | A1 * | 10/2011 | Amdaa | E04H 12/003 52/302.1 |
| 2011/0265402 | A1 * | 11/2011 | Pfleger | F03D 80/00 52/213 |
| 2011/0298218 | A1 | 12/2011 | Murata et al. | |
| 2012/0000816 | A1 * | 1/2012 | Bonora | H01L 21/67772 206/710 |
| 2015/0316024 | A1 * | 11/2015 | Larsen | F03D 1/003 414/564 |
| 2017/0009746 | A1 * | 1/2017 | Jain | E06B 7/04 |

FOREIGN PATENT DOCUMENTS

| | | |
|---|---|---|
| DE | 102008012664 A1 | 8/2009 |
| DE | 102008035350 A1 | 2/2010 |
| EP | 2586933 A1 | 5/2013 |
| KR | 20140001509 U | 3/2014 |
| WO | 2009094991 A2 | 8/2009 |

OTHER PUBLICATIONS

European Patent Office, International Search Report and Written Opinion in PCT Application No. PCT/DK2016/050019, dated Apr. 13, 2016.

Japanese Patent Office, Notification of Reasons for Refusal in JP 2017-558615, dated Aug. 23, 2018.

China National Intellectual Property Administration, First Notification of Office Action in CN Application No. 201680017152.X, dated Sep. 28, 2018.

\* cited by examiner

WIND TURBINE ACCESS PANEL AND METHOD FOR SECURING SAME

This invention relates to an access panel and a method for securing an access panel at an aperture in a wind turbine tower wall. In particular, the invention relates to a removably fixable access panel at a wind turbine tower wall and to a method for securing same.

A horizontal axis wind turbine is illustrated in FIG. 1 to which reference should now be made. Schematic FIG. 1 illustrates a wind turbine 1, comprising a wind turbine tower 2 on which a wind turbine nacelle 3 is mounted. A wind turbine rotor 4 comprising at least one wind turbine blade 5 is mounted on a rotor hub 6.

The hub 6 is connected to the nacelle 3 through a shaft (not shown) extending from the nacelle front. The nacelle 3 can be turned, using a yaw drive positioned at the top of the tower 2, to change the direction in which the rotor blade hub 6 and the blades 5 are facing. The blades are aerodynamically profiled so that they experience a 'lift' or pressure from the wind as the wind flows past the surface of the blade. The angle or pitch at which the leading surface of the blade aerodynamic profile meets the incident wind can be altered using a pitch drive, which turns the blades 5 with respect to the hub 6 thereby adjusting the "lift" achieved by the blades and thereby also the rotational driving force on the rotor for any given wind speed.

The wind turbine illustrated 1 in FIG. 1 may be a small model intended for domestic or light utility usage, or it may be a larger model. Some large models in particular may be installed in large scale electricity generation on a land based or offshore wind farm. A typical commercial wind turbine, for example one that is designed to generate say 3 MW of power, can stand approximately 100 meters high and have wind turbine blades with a length of around 40 m or more. The size of the wind turbine blade, and in particular the area that is swept out by the blades as they turn in the wind is linked to the amount of energy the turbine can extract from the wind. In commercial energy generation wind turbines are therefore large so that they provide the greatest generation capacity. On- and offshore wind turbines are known with rotor diameters in the range between 140 and 180 meters. Some of these models can generate around 8 MW of power. Tower heights above 80 or 100 meters are becoming increasingly commonplace, even extending to heights of 140 meters or more for very large turbines or for turbines whose rotors need significant ground clearance in order to avoid possible local turbulence effects in wind passing close to the ground.

In normal operation such as during power generation, the yaw drive turns the nacelle 3 so that it points the rotor hub 6 into the wind and the pitch drive adjusts the blades 5 of the wind turbine so that they are positioned with an angle of attack which creates lift and causes the rotor 4 to turn. The pitch of the blades can then be adjusted so that they force they experience from the wind is maintained within safe operating parameters, while generating as much energy from the incident wind as possible.

A turbine tower 2 serves multiple purposes. First, it provides a yaw and support platform for a nacelle 3 and blade rotor 4 at such a height that the rotor is clear of the ground and is as much as possible positioned in laminar air currents at the installation location. As such, the tower must possess the requisite structural strength to sustain the rotor and nacelle in position, even under extreme wind or weather conditions. Moreover, considering the dynamic nature of the turbine and of the weather, the tower must be able to perform its functions in spite of mechanical vibrations or oscillations visited on it and this, for the lifespan of the turbine 1 which may be twenty, twenty five or more years. A tower 2 may provide, near its base, an anchoring region positioned and fixed on a foundation. Foundations on land may typically consist in a mass of cast concrete embedded in the land surface or placed on rock formations, into which reinforcing structures, connectable to the tower base may extend. Offshore foundations can take a wide variety of forms. Two common forms include monopile and jacket foundations which latter type resemble a platform construction. In certain constructions, especially in offshore tower constructions, the tower 2 may include a base region connectable or connected to a foundation such as a monopile foundation or jacket foundation and sometimes known as a transition piece. In addition, the tower 2 houses certain wind turbine components, typically those elements which relate to turbine control, servicing or to power transmission from the turbine to the grid. These parts along with the nacelle or rotor etc. need to be serviced from time to time, thereby necessitating access by service personnel. The need to provide access into a tower 2 for personnel can pose a problem in relation to the structural properties of the tower wall. This is especially so since the access locations for service personnel are likely to be at the tower base, namely precisely at the location where the highest loads and stresses act on the tower.

In WO2009094991 there is disclosed a substantially oval doorframe in a tower wall, within which doorframe is arranged a casement incorporating a doorway with a door and also incorporating two ventilation apertures with venting elements, one above and one below the doorway. All these elements are arranged within the extent of the doorframe which is arranged in the form of a coaming through the tower wall, extending both internally and externally of the wall. The doorframe coaming is substantial and oval shaped (when seen in plan view) in order to mitigate for weakening of the tower wall by the provision of access therethrough.

In large turbines, especially offshore turbines and larger land-based turbines, some components located in the tower can be very large and bulky, and sometimes extremely heavy: of the order of several tonnes or tens of tonnes. Moreover, in very large turbines such as offshore turbines, some components which would ordinarily be placed in the nacelle 3 may be too large or too heavy for the nacelle, and may therefore instead be positioned inside the tower 2, sometimes at its base region, possibly in a transition piece region of a tower. Thus, in addition to service personnel requiring access to the tower 2 or turbine 1 from time to time, larger towers 2 may advantageously also be dimensioned to allow large turbine components to be brought inside the tower, and should preferably also allow occasional removal of large components for servicing, repair or replacement. In view of the need to move large elements in or out through the tower, it can be useful to provide a correspondingly large access panel.

In DE102008035350, it has been suggested to provide an access aperture through a tower wall, which aperture is sufficiently large to allow introduction or removal of a wind turbine transformer. To that end, there is proposed a closure plate, larger than the aperture, and removably bolted to the tower wall by means of holes around the plate edge and all around the tower aperture edge. The closure plate encompasses a heavily thickened doorframe portion for an additional, smaller, personnel entrance door.

The size of an access panel can vary although in larger turbines, these may extend in a height dimension up to around six or eight meters or more with a width of up to two meters or more. As such, these panels, being large and therefore also heavy can pose a challenge to put in place or to remove when required. Weather considerations may also need to be taken into account such as winds, which can preclude or at least seriously complicate application (closure) or removal (opening) operations. As such, the need both to support and to accurately locate an access panel such as shown in DE102008035350 or in WO2009094991, at its corresponding tower aperture is difficult and in some conditions, impossible. In offshore locations, the operation may be more difficult still.

There remains a need to provide access to the inside of a wind turbine tower, even while avoiding weakening of the tower structure. Moreover, there is a need for improved convenience relating to access through the tower wall for moving large components or equipment.

SUMMARY OF THE INVENTION

According to the invention, there is provided an access panel configured for fixing to a service aperture in a wind turbine tower outside wall. The access panel being generally planar. It may in particular be removably fixable to the tower wall aperture. According to the invention, the access panel comprises a main panel and an adjacent sub-panel each of which is separately fixable to or removable from the tower aperture. The access panel is in particular of the type to be fitted at an aperture in a wind turbine tower base region and capable of securely closing the aperture. According to the invention, the sub-panel comprises a bearing surface at an edge thereof while the main panel comprises a reference surface at an edge thereof, the main- and the sub-panel being abuttable along a common seam. The seam may in particular define a connecting abutment between the two panel components, in particular between a respective bearing and a reference surface of the sub- and main-panel. The abutment may be a sealing abutment such as a water tight or weatherproof connection. The term "connection" used in the context of the abutment or seam between the main- and sub-panels is not intended to imply a fixed or permanent connection between these respective elements. The two panels remain separable even while they form a seam in the form of an abutment connection. The main panel is dimensioned to close a main region of a wind turbine wall service aperture whereas the sub-panel is dimensioned to close a first sub-region of the aperture, adjacent the main region. The access panel of the invention is defined in appended claim 1. According to the invention, the access panel, being configured as a main panel with a sub-panel may more easily be manoeuvred into position at a wind turbine tower wall in view of the possibility to pre-position the sub-panel in the aperture such that it presents a bearing surface for easier and therefore faster positioning of the main panel accurately into its intended position. The division of the access panel into a main panel and a first sub-panel makes the initial installation of the access panel easier by removing the need to finely adjust the main panel's position in the aperture while at the same time suspending it from a lifting device such as a crane. Instead, the main panel may be placed immediately in the correct position by virtue of aligning its reference surface with the bearing surface of the already installed sub-panel. The sub-panel can be independently put into position in the aperture and adjusted according to the predetermined position of the bearing surface in the aperture. This can be more easily carried out with the sub-panel than in relation to the main panel, owing to the smaller dimensions of the sub-panel in relation to the main panel. In addition, when subsequently it is wished to move large equipment through the tower wall, this can be accomplished by merely removing the main panel, while leaving the sub-panel and its bearing surface in position, thereby making it easier to replace the main panel to close the aperture after passing large equipment through the aperture. Some additional, optional features of the access panel of the invention are defined in appended sub-claims 2-10 and also further described and defined herein.

In the present context, a tower wall aperture may be regarded as having an axis through its centre, about which the aperture extends radially. In some cases, for reasons of minimising stress concentrations generated by it, a tower wall aperture may have an oblong, in particular an oval or elliptical shape which may include a straight-sided oval or oblong shape with rounded ends.

A service aperture in the present context denotes an aperture which is dimensioned to allow passage therethrough of personnel and/or equipment. In aspects of the invention, the term "large equipment" denotes equipment which is too large to be passed through a personnel door in the access panel and dimensioned to fit inside the confines of a wind turbine tower wall. In aspects of the invention, the sub-panel may have less than half the surface area of the main panel, preferably less than one third of the area of the main panel, still preferably, less than a quarter of the area of the main panel or less than a fifth of the area of the man panel. The planar access panel may in some cases be slightly curved thereby describing a curved plane.

According to a further aspect, the sub-panel of the access panel may be a first sub-panel thereof and the access panel of the invention may further comprise a second sub-panel dimensioned to close a second sub-region of the aperture adjacent said main- or first sub-region. In some embodiments, there may be still additional sub-panels. In any case according to the invention, there is provided one sub-panel, that is to say at least one.

In aspects, the access panel of the invention may comprise an aperture for an auxiliary door. The auxiliary door may in particular be dimensioned to allow passage of service personnel between said interior region and said exterior of said tower. In aspects, the auxiliary door aperture may preferably be fully or partially comprised within the main panel of the access panel. Hence, in aspects, the auxiliary door aperture may be fully encompassed within the access panel main panel. Alternatively an auxiliary door aperture may be fully or partially encompassed within a single sub-panel thereof. In this context, the term "fully encompassed" denotes that a single panel encompasses a whole doorframe of an auxiliary door with the possible exception of a bottom or a top doorframe portion. In one aspect the first or second sub-panel panel does not encompass a doorframe or at most, encompasses only a top or a bottom rail portion of an auxiliary door frame. The term "auxiliary door" denotes a door, preferably hinged to a door frame thereof in a known manner. In some aspects, the door may be provided as a hatch, possibly with an alternative retention means than hinges. The word "auxiliary" denotes the door being of smaller dimensions than the access panel or than the tower wall aperture.

According to aspects of the invention, neither the main panel of the access panel nor a first sub-panel of the access panel may be a hinged door. However, in aspects, either or both the main panel or a sub-panel may comprise or constitute an auxiliary door frame or part thereof.

The main panel may define a main region of the access panel while the sub-panel may define a first sub-region of the access panel. A second or subsequent sub-panel may define a second or respective subsequent sub-region of said access panel. The sub-panel preferably comprises a planar element capable of closing a first sub-region of the aperture. Alternatively, in one aspect, the sub-panel may comprise a frame type structure, a side of which comprises a bearing surface. A closure panel may be fixed or fixable to the frame of the sub-panel to thereby generate a closure element against e.g. weather.

In still further aspects, the sub-panel of the access panel may comprise one or more radial locators which locators provide radial adjustment between the sub-panel and a tower wall aperture. This arrangement facilitates positional adjustment of the bearing surface in relation to the tower wall aperture. Moreover, a radial locator may in particular appropriately comprise an anchor fixed to the sub-panel, a separation adjuster and a foot, which may be a resilient foot, in particular made from a resilient material such as rubber or synthetic rubber or other plastics material. A separation adjuster may in particular include a shank positioned between the anchor and the foot of a locator. A separation adjuster of a radial locator is preferably capable of varying the separation or relative radial position between the sub-panel and a tower wall aperture. A sub-panel may preferably comprise one locator, still preferably two or three or four or more locators arranged spaced apart along or near a peripheral edge of the sub-panel. In aspects, it may be desired to place a locator or more than one locator on a main panel, although this is not strictly necessary in most embodiments of the invention.

In a tower wall which is made of metal such as steel, the provision of holes in the tower wall can prove detrimental to its structural strength. Also, significant welds around a tower wall aperture can considerably weaken a tower. Both welds or holes may in particular generate significant local stress concentrations which may precipitate structural failure under conditions in which a plain wall without these features would maintain its integrity. This can be a sensitive issue because a wind turbine tower can be expected to need to withstand extraordinary loads multiple times during its lifetime without failing. It may be sensitive also because, especially when steel tubing is used as the tower wall construction material, the added cost of providing thicker steel plate, able to withstand extraordinary loads even when it is welded or pierced with multiple bolt-holes, can be considerable. Moreover, the rugged connection arrangement for the access panel shown in DE102008035350 would tend to scuff or otherwise damage a protective paint surface coating, possibly necessitating repainting with protective paint such as weather proof paint after each assembly of the access panel. This type of paint work may be very awkward and unsatisfactory to perform in situ. Hence, there is a need to provide a solution for fixing an access panel to a wind turbine aperture which reduces or removes the necessity to make holes in the tower wall or to provide welds or welded fixing elements on the tower wall, especially near its service aperture. There is also a need to develop a fixing solution for an access panel of a wind turbine tower which as much as possible leaves a weatherproof coated thereof surface undamaged during fitting of an access panel over the aperture and during use of the aperture, i.e. following its removal and replacement, possibly for moving equipment into or out from the tower.

In order to secure the access panel in position at a tower wall aperture, the access panel may itself preferably comprise a set of fixing elements configured to securely, and preferably immovably, fix the panel in place at a tower wall aperture. The set of fixing elements may be configured to securely fix the panel in place at an aperture without requiring through holes or any significant in the tower wall. Preferably, each or any panel of the access panel may comprise fixing elements or a set of fixing elements. In the case of a first sub-panel, the fixing elements may be additional to the one or more locator.

In a further aspect, fixing elements configured to securely fix the access panel in place at a tower wall aperture may be provided on the main panel of the access panel and preferably also on a sub-panel thereof such as on a first and/or a second sub-panel. By securing each individual panel to the tower wall aperture, the access panel as a whole is thereby securely fixed in place, with the access panel fixedly and removably connected to the tower wall aperture.

In still further aspects, a fixing element may comprise an axial clamp, thereby to effect an axial clamping action between the access panel and the tower wall aperture. In this regard, the access panel is preferably axially secured to the tower wall aperture by virtue of the axial clamping of each of the main- and sub-panel in position. Preferably, each clamp comprises an anchor fixed to a main or sub-panel of the access panel, a clamp force adjuster and a resilient clamp head. The resilient clamp head may preferably comprise a body which is elastically deformable upon contact with the tower wall aperture and following a tightening adjustment of the axial clamp force adjuster with the main- or sub-panel in position at a tower wall. Preferably the clamp head is made from a material such as polyamide which is considerably more deformable than steel and preferably having an elastic modulus less than 12 GPa or less than 10 GPa or less than 8 GPa or less than 6 GPa. Preferably, the clamp head has a considerably lower surface hardness than steel. In embodiments, the clamp head may be made from a plastics material. Preferred materials may include aliphatic polyamides such as a Nylon™ material or other polyamides or other similarly elastically deformable resilient material. In aspects, the clamping surface of the clamp head may comprises the deformable clamp head material, which may preferably, have a Shore D hardness less than 95 or a Rockwell R hardness less than 130. The clamp head material may optionally have a shear modulus less than 10 GPa or less than 8 GPa or less than 6 GPa. In aspects, the deformable clamp head material comprising a plastics material having a shear modulus less than 6 GPa and an elastic modulus less than 4 GPa.

A clamp head is preferably shaped and positioned in a fixing element such as to enable an axial pulling force to be applied to a radially inward region of the clamp head while the clamp head transmits a pushing force against an immovable tower wall aperture interior surface through a portion of the clamp head which is located or positioned radially outward of the point of application of the pulling force. As such, a pushing force may be applied to a tower wall aperture interior surface, in particular at a location radially outward from the point of application of the pulling force. The clamp head may thereby be subject to shear forces. A landing pad or a series or landing pads or one or more landing strips may be applied to the interior surface of the tower wall aperture to protect it from friction damage by the application of a clamping force. Such pads may preferably be non-metallic or non-ceramic or made from a plastics material such as a Nylon™ or other resilient, preferably smooth-surfaced materials.

Therefore, in preferred embodiments the clamp head may be axially adjustable in relation to an anchoring point on the access panel or part thereof. This arrangement may preferably allow a separation distance between a clamp anchoring point on an access panel portion and the relevant clamp head to be axially varied by means of an adjuster. In this context, the axial variation is in a direction or comprises a component in a direction along or parallel to the axis normal to the plane of the access panel.

In order to ensure an optimal, possibly predetermined, radial seating of the access panel in a tower wall aperture the clamp head may exhibit a generally axially extending surface having a tapered profile in a radial direction thereof. This arrangement will ensure that as the axial clamp is tightened with an access panel portion in position in a tower wall aperture, the clamp head will be drawn towards its anchoring point on the access panel. Its tapered axially extending surface will thereby advance past and along a rim region of the tower wall aperture and engage therewith to radially nudge the relevant portion of the access panel into an intended radial seating position of the access panel portion in the wall aperture.

In some embodiments, the fixing elements such as axial clamps may be removably connectable or securable to the access panel or to portions thereof. This will for example enable exchange or replacement of fixing elements or parts thereof if required. In embodiments at least an anchor or anchor point of a fixing element may be permanently connected to a portion of the access panel such as by welding or by forming as an integral part of the access panel.

In a further aspect, the invention relates to a wind turbine tower provided with a service aperture extending radially about an aperture main axis and comprising an access panel removably secured therein. The access panel in particular is comprised of a main panel and a sub-panel, each of which may be fitted into the aperture in separate or sequential operations. The access panel is in particular an access panel as described or defined herein.

In particular, a tower of the invention may comprise a service aperture in a base region of the tower wall, which region may, in some models such as offshore models, correspond to a transition piece between a jacket or monopile and a tower base. In some cases, the tower base region may correspond to an upper region of a monopile. A tower according to the invention is defined in appended claim 11. Optional features thereof are defined in appended subclaim 12.

Accordingly, in preferred aspects, the main panel of the access panel may comprise a set of fixing elements—in particular axial fixing elements—which securely fix the main panel in place at the tower wall aperture. In preferred aspects, also a sub-panel or each sub-panel is also provided with fixing elements preferably of the same or similar type. By means of the fixing elements, the access panel may be secured in place at the tower wall aperture.

Preferably, in accordance with the invention, and where the tower walls are of steel, an access panel may be fixed to the tower wall aperture by means of fixing elements without requiring welded fixing elements or welded fixings at, nearby or around the tower wall aperture. In particular, in this regard, it is possible to completely avoid or very substantially to reduce to an absolute minimum, the number of welds applied onto the tower wall. In particular, the access panel may be fixed securely to the tower wall without the use of tower wall welds for the fixing. Whilst in may be unavoidably necessary to apply some minimal welds at or nearby a tower wall aperture, such as for hanging sundry, relatively small non-structural fixings, these may be limited to minimal welds with little or no stress-concentrating impact on the tower wall. Hence, in aspects, the invention allows avoidance or significant reduction of welds near a tower wall aperture. Preferably, in aspects of the invention, the tower wall interior surface in the region of the service aperture is substantially smooth, uninterrupted by holes or welds.

Similarly, in aspects of the tower of the invention, an access panel may be fixed to the tower wall aperture by means of fixing elements without requiring blind or through holes at, nearby or around the tower wall aperture. In particular, in this regard, it is possible to completely avoid or very substantially to reduce to an absolute minimum, the number of holes applied onto or pierced into the tower wall. In particular, the access panel may be fixed securely to the tower wall without the use of tower wall holes for the fixing. Whilst in may be unavoidably necessary to apply some minimal holes at or nearby a tower wall aperture, such as for hanging sundry, relatively small non-structural fixings, these may be limited to minimal holes with little or no stress-concentrating impact on the tower wall. Hence, in aspects, the invention allows avoidance or significant reduction of holes near a tower wall aperture.

In preferable aspects of the invention, the access panel in the tower wall aperture may be dimensioned to completely close, i.e. to cover the entire periphery of the tower wall aperture. This does not exclude the provision of ventilation apertures of various types in either a main- or a sub-panel nor does it exclude the provision of an auxiliary door aperture such as an auxiliary doorframe in a main panel or in a sub-panel. As mentioned, a main panel may close, surround or cover a main region of the tower wall aperture while a sub-panel may cover, surround or close a first sub-region of the aperture. If there is more than one sub-panel, then each respective sub-panel may close, cover or surround a successive second, third or further sub-region of said aperture etc.

In a further optional aspect, the tower wall base region according to the invention may be made from sheet steel. In particular such sheet steel walls may have a thickness greater than 25 mm or 30 mm or 40 mm or 50 mm. In some cases, wall thickness may be of the order of 60 mm or more. In aspects, the tower wall thickness may be substantially constant around the entire aperture, or perhaps +/−up to 5 mm.

Alternatively, in further aspects of the invention, the tower of the invention may be defined as a wind turbine tower having a tower top region and a tower base region and comprising a longitudinally extending generally cylindrical wall; said tower wall having a wall thickness; said tower defining an interior region within said wall and an exterior outwith said wall; said tower wall being provided with a service aperture at a base region thereof, which aperture extends radially about an aperture main axis and which aperture is dimensioned to allow passage of personnel and equipment between said exterior and said interior region; wherein said tower further comprises an access panel removably fixed at said tower aperture; wherein said access panel further comprises an auxiliary door aperture; wherein said access panel is an access panel as described herein or according to any claim 1-10.

In aspects, the invention also comprises a method for fixing an access panel into a wind turbine tower service aperture, the method comprising placing a sub-panel of an access panel at a first region of the aperture and precisely adjusting the relative radial position between the sub-panel and the service aperture to thereby bring a bearing surface of the sub-panel into a predetermined position in relation to the aperture. The method thereafter further comprises positioning a main panel of the access panel in the aperture at a main region of the aperture by abutting a reference surface of the main panel against the bearing surface. The method of the invention preferably additionally requires both the sub-panel and the main panel to be fixed securely in position. This may preferably be achieved, according to aspects of the invention, by first securely fixing the sub-panel in position prior to positioning the main panel in the aperture with its reference surface adjacent or abutting a bearing surface of the sub-panel. The main panel may preferably be fixed in position after it has been placed into its desired position in the aperture. In some aspects, there may be a degree of adjustment of the radial position of the main panel in the aperture prior to fixing it securely. This latter step may not be necessary according to other aspects, notably in cases for which a positioning of the main panel in relation to the sub-panel suffices to adequately locate the main panel in its desired predetermined position in the service aperture. A method for fixing an access panel in position in a wind turbine tower wall is defined in appended claim 13. Further optional features thereof are defined in appended subclaim 14.

In preferred aspects, the access cover in the method of the invention is an access panel as described herein and preferably the wind turbine tower wall aperture into which the access panel is fitted extends generally radially about an aperture axis passing normally through the dominant plane of the aperture. In preferred aspects, the aperture may have an oblong or generally oval shape such that it preferably comprises two ends or end regions and two sides or side regions. According to the method of the invention, the access panel comprises a main panel having a reference surface at an edge thereof and a sub-panel having a bearing surface at an edge thereof. In preferred aspects, the method may comprise positioning the sub-panel a first region of the aperture being at an upper or lower end of the aperture by placing it at a upper or lower end of the aperture before making a final radial positional adjustment to bring it into its predetermined bearing position.

Optionally, radial positional adjustment of the sub-panel may be achieved by means of an adjustable radial locator, in which case, the method may include adjusting it to thereby controllably vary the relative position of the bearing surface in the aperture in such a manner and to an extent necessary to bring it into its predetermined bearing position. In aspects, the sub-panel may comprise one or more radial locators.

In general, the method of the invention provides the advantage that the main panel may be inserted into position in the tower wall aperture without needing additional fine adjustment of its position, by relying on an abutment between the pre-positioned and fixed bearing surface of the sub-panel and the reference surface of the main panel, to bring the main panel in one step and accurately into its desired position in the aperture. This can in particular avoid a need to both make fine positional adjustments to the main panel, which in many cases may be quite large, for example of the order of between three to eight meters across its height extent, while at the same time suspending the main panel at the aperture, for example by means of a lifting device. Alternatively, in some aspects, there may be provided one or more radial locators for enabling an adjustment to the radial seating of the main panel in the aperture. In embodiments one or more radial locator may be provided mounted or connected to the sub-panel. In still further embodiments there may be one or more radial locator provided connected to or mounted on the main panel.

The invention further encompasses a method of use of an access panel in a wind turbine tower as described herein. The method may in particular consist in a method for bringing large equipment into or out of a wind turbine tower through an access panel which may be an access panel as herein described. In aspects, the access panel main panel may include an auxiliary doorframe and an auxiliary door dimensioned to allow passage of service personnel therethrough. The method includes removing the main panel from the aperture while leaving a sub-panel having a bearing surface in place in the aperture, and thereafter moving the large equipment through the aperture with the assistance of a lifting device such as a crane. The method may in particular be followed by replacing the main panel in the aperture preferably using a lifting device, by bringing the main panel into abutment with the fixed bearing surface of the sub-panel and thereafter positioning the main panel in the aperture before fixing it in place as described herein. A method of the invention is defined in appended claim 15. Further optional features thereof and additional features and embodiments of all aspects of the invention are defined herein.

BRIEF DESCRIPTION OF THE DRAWINGS

The invention and aspects thereof will now be described in more detail, and by way of non-limiting examples, with reference to the not-to-scale, figurative drawings, in which.

EXAMPLES OF ASPECTS OF THE INVENTION

Figure 1:
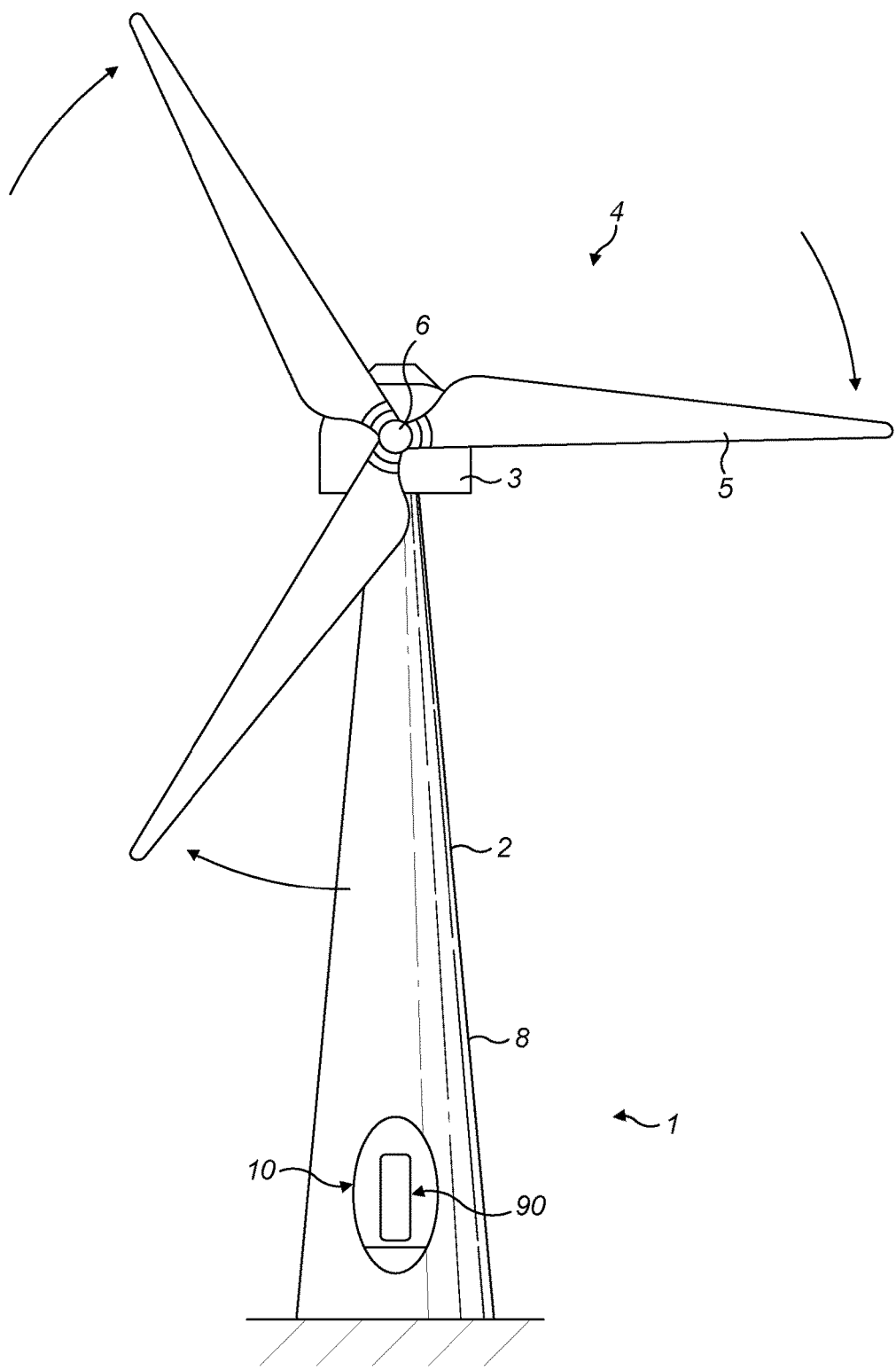
FIG. 1 shows a schematic illustration of a wind turbine according to aspects of the invention including a service aperture.
Figures 2, 2A:
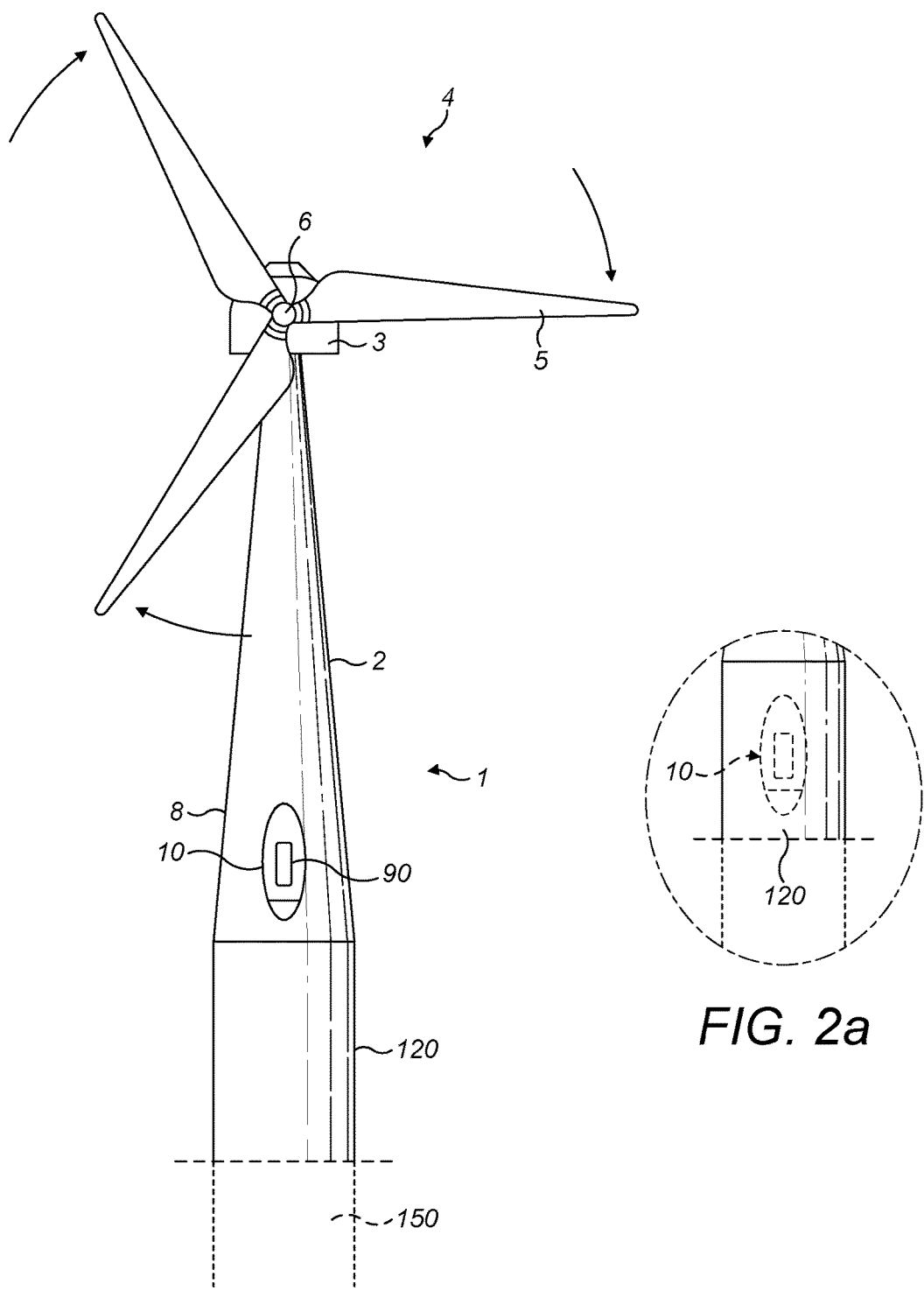
FIG. 2 shows a schematic illustration of a further wind turbine according to aspects of the invention including a service aperture.
FIG. 2*a* shows some details of a variant.

The towers 2 illustrated in FIGS. 1 and 2 are shown with a schematically indicated access panel 10 according to aspects of the invention and fitted over a service aperture 7 in the tower wall 8. In both FIGS. 1 and 2, the service aperture is provided in a base region of the tower 2. In FIG. 1, the service aperture 10 is shown provided in a base region of the tower 2, close to a foundation near ground level, while in FIG. 2a, it is shown (dashed lines) in a transition piece 120 also known as an intermediate segment, which may connect the tower to a jacket or to a monopile type foundation 150 suggested in the illustration in dotted lines. For the purposes of this disclosure, a base region of a tower may be deemed to include a transition piece or intermediate segment 150. In some aspects, an external platform may be provided in a base region of a tower 2, as suggested in FIG. 2. In the illustrations of FIGS. 1 and 2, the access panel 10 is shown in two parts, a main panel and a sub-panel, details of which are discussed below. Also visible in the access panel 10 is an optional auxiliary door 90 which allows access for service personnel without requiring opening of the entire access panel.

Figure 3:
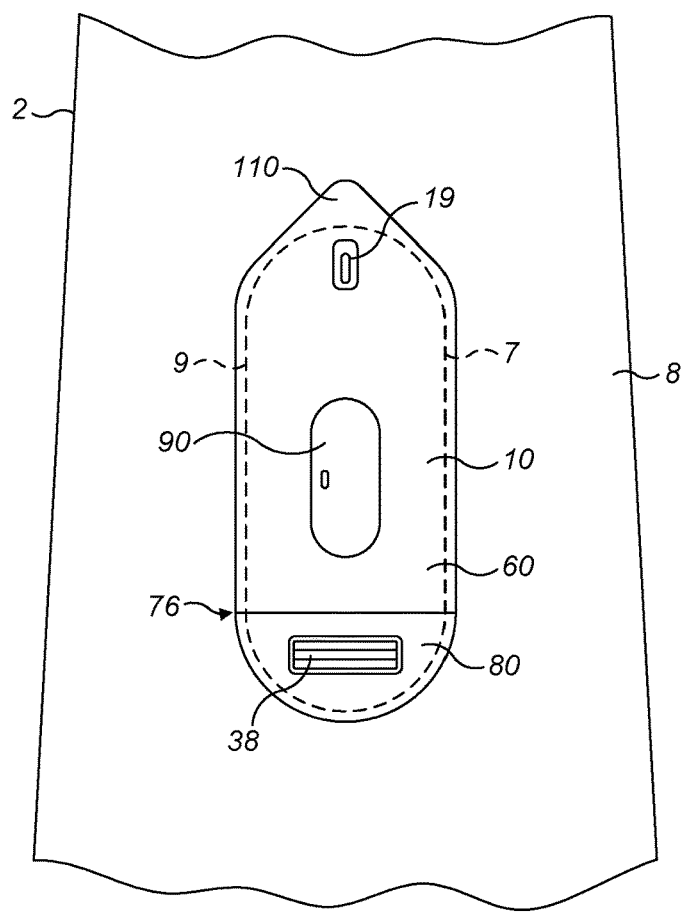
FIG. 3 shows a schematic illustration of a slightly enlarged view of an access panel according to aspects of the invention on a wind turbine tower.
Figure 3A:
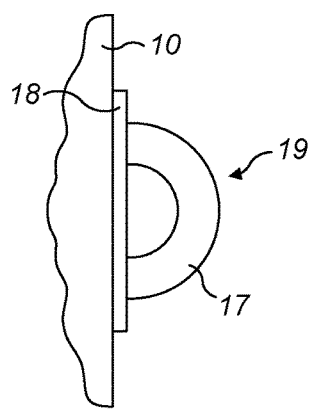
FIG. 3*a* shows a detail from FIG. 3.

FIG. 3 shows some more detail of a tower 2 base region including a service aperture 7 covered by an access panel 10 in which is optionally located an auxiliary door 90 for access by service personnel. The access panel 10 can be clearly seen in two parts, namely a main panel 60 and a sub-panel 80. These two elements abut along a common seam 76 defining an abutting contact boundary between the two panels of the access panel. The sub-panel 80 is shown here with a ventilation aperture 38 by way of optional additional feature. In some embodiments no such ventilation aperture 38 may be provided, or it may be provided elsewhere in the tower 2, in some cases for example, at a location higher up the tower 2 (not shown). A hoisting point 19 is illustrated on the main panel 60 of the access panel 10 and is shown schematically in greater detail (FIG. 3a) in a cutaway side view of an access panel top portion. The illustrated exemplary hoisting point 19 comprises a back plate 18 with an eye 17 rigidly fixed thereto. The backplate 18 is securely fixed to the main panel 60 at an upper region thereof and allows the main panel 60 to be suspended in a more or less vertical orientation when hoisted by a lifting device such as a crane (not shown). Also indicated in FIG. 3 is the rim 9 of the service aperture 7 shown by way of a dotted line. Optionally, the access panel may, at an exterior topmost portion thereof, be provided in the shape of a pointed gable to deter bird-nesting tendencies which might otherwise conflict with a need to open the access panel. In this context the term "topmost" denotes the highest part of the access panel when it is in position at a tower wall aperture.

Figure 4:
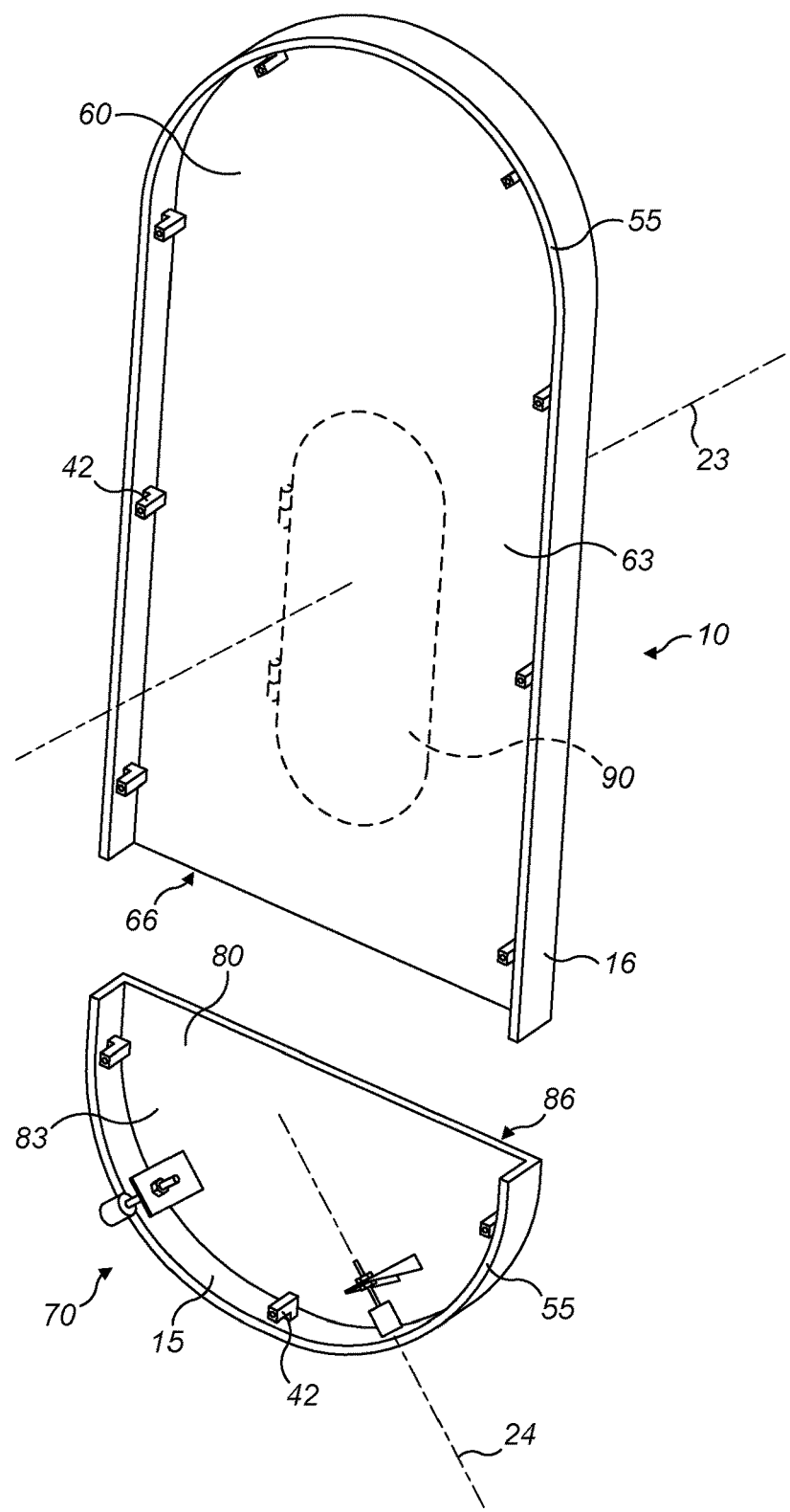
FIG. 4 shows a perspective illustrative view of an interior side of an access panel according to aspects of the invention.

The access panel 10 is generally shaped and configured to be seatingly fitted and secured at the tower service aperture 7. To that end, the access panel 10 and the service aperture have a generally similar shape, wherein the access panel 10 is dimensioned such that it is large enough to completely fill the service aperture 7 and to exhibit a slight radial overlap, extending over and onto the tower wall outside surface 31. The example shown in FIG. 4 is of a generally oval-shaped aperture 7 and access panel 10, wherein the opposite longitudinal sides of the oval shape are generally straight and parallel. The ends of the aperture 7 are generally curved and the access panel 10 may advantageously be correspondingly curved at its ends. As mentioned, in embodiments, there may be a small departure from a strict curved end of an access panel or portion thereof provided always that the overall extent of the access panel 10, including all its parts, is sufficient to cover the radial extent of the service aperture 7.

In aspects, of the invention a wind turbine tower 2 may comprise a tower top region and a tower base region and a longitudinally extending generally cylindrical wall 8. A tower wall 8 may in particular have a wall diameter which progressively decreases in a direction from the base region towards the top region. The tower wall 8 may have having a wall thickness which progressively decreases in a direction from the base region towards the top region. The tower 2 may in particular define an interior region within the wall 8 an exterior outwith the wall 8. The tower wall 8 is provided with a service aperture 7 in its base region, which aperture extends radially about an aperture main axis and which aperture 7 is dimensioned to allow passage therethrough of personnel and equipment between the exterior and the interior region. The tower 2 according to the invention further comprises an access panel 10 removably fixed at the tower aperture 7 and as herein described or defined.

In further optional aspects, the tower wall 8, at a region adjacent the service aperture 7, for example within 1 m of the aperture edge face 32, comprises neither through-holes nor structural welds. In this context, a structural weld may be a weld which directly or indirectly supports the weight of the access panel 10 or at least a substantial or major part of it.

Preferably, the tower wall 8 has a weather- and waterproof painted surface extending over substantially all the exterior region of the wall 8 adjacent the aperture 7. Preferably, the painted surface extends all around an inner rim 9 of the aperture 7 and preferably the painted surface extends about substantially all of an interior wall region 33 and exterior wall region 31 adjacent the aperture 7.

A view of the access panel 10 can be seen in FIG. 4 which illustrates the panel from a generally interior perspective view. A main panel 60 is shown with an optional raised side wall 16. Also sub-panel 80 has a raised side wall 15. In embodiments, the side wall 16, 15 of the access panel 10 may have a variable depth in order better to accommodate a possible curvature of the tower aperture wall 8. In embodiments, a cover panel 63 of the main panel 60 may be planar, in particular, it may preferably be substantially flat. In embodiments, it may be provided with a slight curvature equal to or less than the tower wall 8 curvature at its service aperture 7 region. Also the sub-panel 80 has a generally planar cover panel portion 83. As with the main panel cover portion 63, the sub-panel cover portion may also be planar, being either substantially flat or slightly curved. In general, it is preferred for the planar cover portion 63, 83 of the main and sub-panel to be conformed to each other. In some aspects, it may be preferred to provide the cover panel 83 of the sub-panel 80 separate from a sub-panel frame although this is not illustrated. Also shown in FIG. 4 is an optional facing rim 55 around the side wall 16 of the access panel 10 which may provide a broader connection surface between the access panel 10 and a tower wall 8. The facing rim 55 or simply the rim of the side wall 16 may preferably be provided with a sealing bead 57 (not shown in FIG. 4) to improve a weatherproof connection between the access panel 10 and a tower wall 8 and to prevent damage to the tower wall outer surface 31 treatment (if any) such as weatherproof paint.

The access panel extends radially about a main axis 23 which may also be called a closure axis. It denotes an axis normal to the plane of the access panel 10, in particular, normal to a cover panel 63 thereof. It may be coincident with the main axis of a tower wall aperture 7 when fitted in position thereat. The generally planar access panel 10 extends generally radially about the main axis 23. The access panel 10 may comprise fixing elements 40 although these are only partially illustrated for simplicity. In particular the fixing elements 40 may comprise axial clamps 41 of which—for simplicity—only the anchor portions 42 are shown in FIG. 4. These are fixed to the main panel 60 and also to the sub-panel 80. The number and distribution of the axial clamps 41 may be varied according to circumstances such as according to the overall size of the access panel 10. In addition, the sub-panel 80, is shown having radial locators 70 which are adjustable in a generally radial direction 24 of the access panel 10 and thereby also in a radial direction of the sub-panel 80. Adjustment of the locators 70 moves a foot 74 of the locator 70 in a radial direction 24, that is to say in a direction generally outward or outboard from the sub-panel 80 and generally parallel to the dominant plane of the sub-panel 80. In this context, the dominant plane of the access panel 10 or sub-panel 80 or main panel 60 may be considered to coincide with the plane of its respective cover panel 63, 83. It may lie parallel to the dominant plane of a tower wall service aperture 7, when the access panel 10 is fitted therein.

The sub-panel 80 comprises a bearing surface 86 along one edge thereof. In the illustration, the bearing surface presents a planar, flanged face although this is not essential. The bearing surface 86 is configured to co-operate with and to abuttingly connect with a correspondingly shaped reference surface 66 provided along one edge of the main panel 60. The abutting, co-operating bearing and reference surface thereby constitute a seam 76. For improved weatherproofing, a sealing bead may optionally be provided along the seam 76. The seam 76 comprises two mutually separable or releasable parts. In particular, the seam 76 may comprise reference surface 66 and a bearing surface 86. It is not intended to be a permanent fixed connection. The configuration of the respective bearing and reference surfaces 86, 66 may be varied to be overlapping or engaging if desired. Preferably, the sub-panel 80 bearing surface 86 presents a support and locating surface for the main panel 60.

Figure 4A:
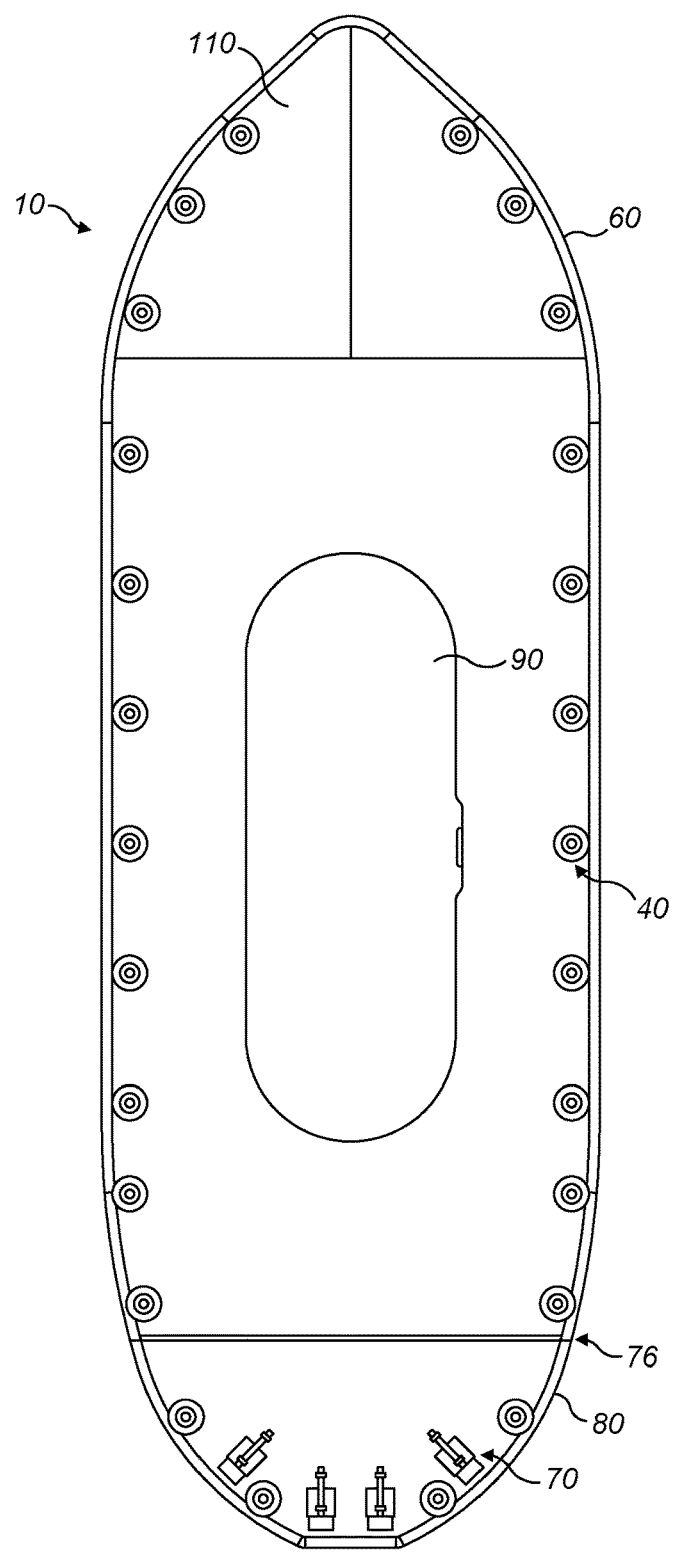
FIG. 4*a* shows an interior elevation view of an access panel according to aspects of the invention.

FIG. 4a shows an elevation view of an access panel 10 similar to the panel of FIG. 4, with some slight constructional variations. A pointed gable is shown atop the access panel 10 and the exemplary fixing elements 40 are illustrated in position at the periphery of the access panel 10. The cover panel 63 of the main panel 60 is shown as a composite panel made from connected pieces of panelling. In particular, the gabling is created using additional panel portions although these are not separate panels from the main panel 60 as they are not independent or separately positionable in the aperture 7. In the illustrated embodiment, the sub-panel comprises four locators 70. The sub-panel 80 is configured to extend across a first sub-region of an aperture 7 which extends in a vertical, height direction of the aperture of less than one fifth of the overall aperture height, measured from the inside edge face of the aperture 7.

Figure 5:
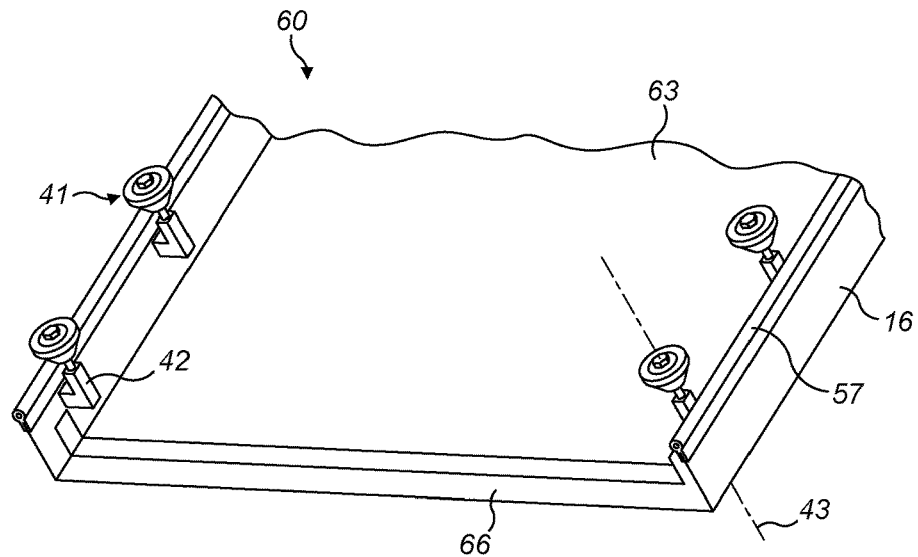
FIG. 5 shows a partially cutaway perspective illustrative view of an edge region of a main panel of an access panel according to aspects of the invention.

In FIG. 5, there is shown a more detailed perspective cutaway view from below an exemplary main panel 60 in which a reference surface 66 is provided in the form of a groove, thereby configured to abuttingly co-operate with a projecting bearing surface 86 of a sub-panel 80 which may seatingly engage inside the groove 66. Also visible in FIG. 5 is a sealing bead 57 along the facing edge of the raised side wall 16. Fixing elements 40 illustrated in the form of axial clamps 41 are shown by way of example, further details of which are discussed below. The axial clamps 41 act to provide a fixing or clamping force generally along a clamping axis 43, parallel to a main- or closure axis 23 of the access panel 10.

Figure 6:
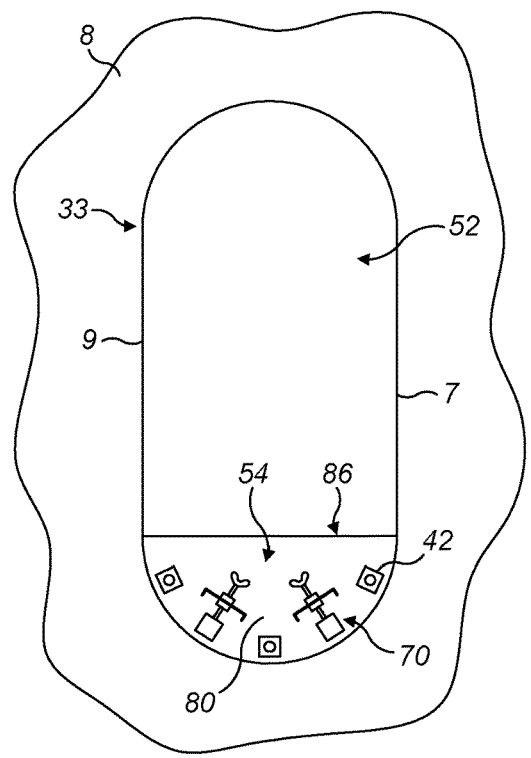
FIG. 6 shows a partially closed wind turbine tower aperture according to aspects of the invention.

In FIG. 6, there is shown a sub-panel 80 of an access panel 10 from a viewpoint within the tower 2 showing a tower wall 8 interior surface 33 in a region surrounding the service aperture 7. The sub-panel 80 comprises locators 70 which are radial locators. The example which is illustrated shows two locators at the sub-panel 80 although in some cases a single one may suffice. Alternatively, three or four locators 70 may be preferred at a sub-panel 80. The sub-panel 80 is shown covering a first sub-region 54 of the service aperture 7, while a main region 52 thereof is open. For simplicity, fixing elements 40 are shown only in part, namely in the form of anchoring portions 40 connected to the sub-panel 80. As discussed in the context of FIG. 4, the locators 70 allow radial adjustment of the sub-panel 80 such that the sub-panel bearing surface 86 may be accurately positioned in a bearing position in the aperture 7. Hence, in FIG. 6, the sub-panel may be said to be positioned in the aperture 7 although not securely fixed thereto. The precise seating of the sub-panel 80 may be carried out by adjusting the locators 70 such that the bearing surface 86 is positioned accurately in a predetermined bearing position within the aperture 7. In the example illustrated, the bearing surface 86 may extend, in its predetermined position, substantially across a curved end region of the aperture 7. In preferred aspects, the bearing surface 86 may be substantially planar although a surface with a slight curvature such as a concavity may assist rapid seating of a corresponding reference surface 66.

Figure 7:
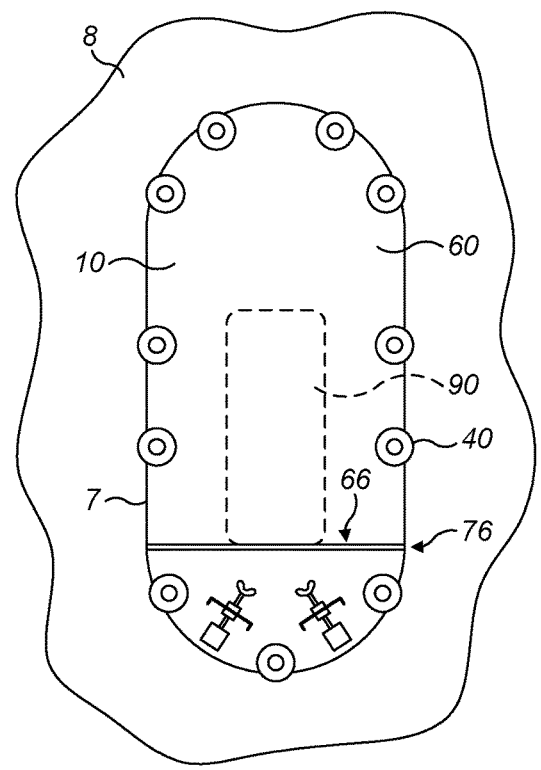
FIG. 7 shows a schematic illustration of wind turbine tower aperture fully closed by an access panel according to aspects of the invention.

In FIG. 7, there is additionally illustrated a main panel 60 with fixing elements 40 which may be axial clamps 41. Also the sub-panel 80 is shown, in this example, with fixing elements 40 which secure the access panel 10 in position at the service aperture 7. In this illustration, the access panel 10 is shown fixed in position by the fixing elements 40. In other words, both the main- and sub-panels 60, 80 are independently fixed in position and contacting each other, thereby making up the access panel 10 which covers the full radial extent of the service aperture 7.

Also visible in FIG. 7 is a reference surface 66 of the main panel 60 in abutting relationship with the bearing surface 86 and thereby forming a connection in the form of a common seam 76. The seam 76 may additionally comprise a sealing strip (not shown) to improve its properties against the influence of weather outside the tower. The main panel is shown without radial locators 70 although these may optionally be provided if desired although it is not essential to do so and faster installation of the main panel 60 may be achieved without locators. Preferably, the main panel 60 is located in position in the aperture 7 by placing it against the bearing surface 86 of the previously installed sub-panel 80 such that its reference surface 66 co-operates therewith. Moreover, the view illustrated in FIG. 7 is from within the tower 2: it can be seen that with the fixing elements 40 and locators 70 positioned on the interior surfaces of the elements of the access panel 10 are accessible from within the tower 2. Securing the access panel 10 in position or releasing it from its secured position may thereby advantageously be carried out from within the tower 2.

An optional auxiliary door 90 may also be provided in the access panel 90. As can be appreciated from the relatively smaller dimensions of the auxiliary door 90 in relation to the service aperture 7, the door is intended for use by personnel while the dimensions of the aperture 7 allow for the passage through it of large pieces of equipment, larger than the auxiliary door dimensions. Since it is not envisaged to need to move large pieces of equipment through the service aperture 7, its fixing elements 40 may be of a significantly different type than the opening mechanism of the auxiliary door 90 which may be expected to be in relatively frequent use. Where an auxiliary door 90 is encompassed within the main panel 60, the positioning of the main panel 60 across a main region 52 of the aperture 7 thereby also puts the auxiliary door 90 into position.

Figure 10:
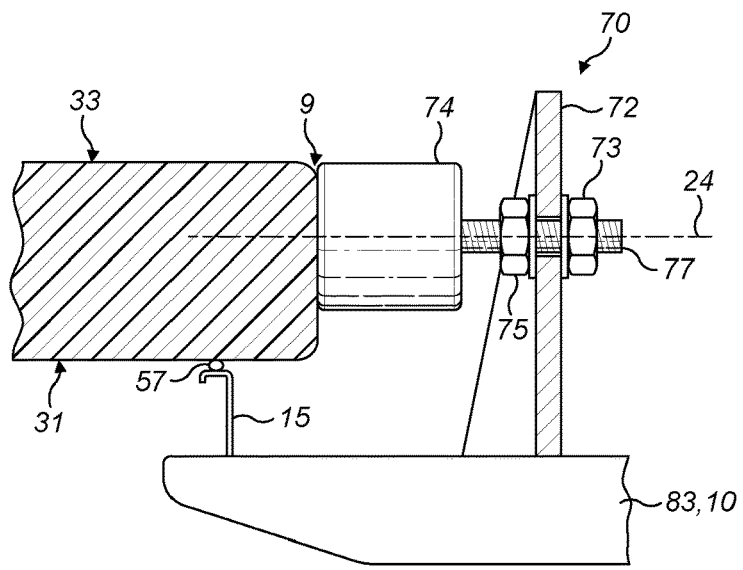
FIG. 10 shows a schematic illustration of a locator according to aspects of the invention.
Figure 11A:
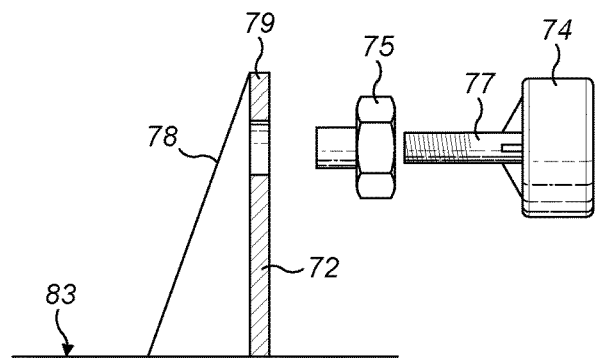
FIGS. 11*a* and 11*b* show a schematic illustration of further aspects of a locator according to aspects of the invention.
Figure 11B:
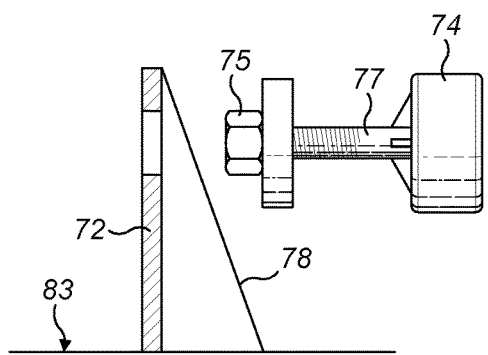

Locators 70 which allow to adjust and to hold the position of a part of an access panel 10, such as a sub-panel 80, in a tower wall aperture 7 may take a variety of forms in accordance with the invention. One embodiment of a radial locator will be described with reference to FIGS. 10, 11a and 11b. A similar locator 70 can also be seen in FIG. 4. A locator may comprise a radially displaceable foot 74, capable of being moved and adjusted in a radial direction 24 of the access panel 10 generally parallel to the plane of the panel. The foot 74 may preferably comprise a pad made from an elastic material such as rubber or synthetic rubber and which offers a high level of friction when contacting a counter surface or when urged thereagainst. The foot 74 is fixed to an adjustment shaft 77 which is held in a support flange 72 illustrated in the form of a bracket fixed or welded at its base to a part of the access panel 10 such as a sub-panel 80 in particular a cover panel 83 thereof. The support flange 72 may comprise a projecting portion 79 which may be a main plate, the projecting portion being fixed to the access panel 10 or a portion 60, 80 thereof and being provided with an aperture or recess. A prop 78 may extend from the support flange 72 projecting portion 79 to the access panel 10 to provide an abutment for a pushing action of the locator foot 74 and shaft 77. An adjuster 75 in the form of a nut may be actuated to controllably impart a translation of the shaft 77 in a radial direction 24. In particular, actuating the adjuster 75 has a surface which pushes against a surface of the support flange 72 to thereby urge the shaft 77 and the foot 74 at a radially outermost end thereof in a radially outward direction. Conversely, actuation of the adjuster 75 in an opposite direction allows the locator shaft 77 and its foot 74 to retract inwards towards the support flange 72. A tightening nut 73 on the shaft 77 may be used to tighten the foot 74 and shaft 77 in a retracted or extended position. In embodiments, the tightening nut 73 may be on a side of the support opposite the actuator 75. In embodiments, an adjuster 75 may take the form of a radially flared nut with a waisted portion projecting through an aperture in the support flange 72. A driving surface of the flared nut may be provided at the flared portion or at the waisted portion. In each case, the actuator 75 driving surface can be provided such that the driving surface is positioned at a face of the support flange 72 bracket opposite a prop 78, thereby assuring improved access by an adjustment tool when adjusting the shaft 77 and foot 74 radially inward or outward. When placed in a tower wall aperture, the foot 74 may be brought to bear against an aperture edge face. The relative position of the associated sub-panel 80 in the aperture 7 can be controllably adjusted and varied by actuating the adjuster 75 and tightening as necessary to set it in position at a relative distance from the aperture edge 32 which may in particular correspond to a predetermined position of the bearing surface 86 of the sub-panel 80.

Figure 8:
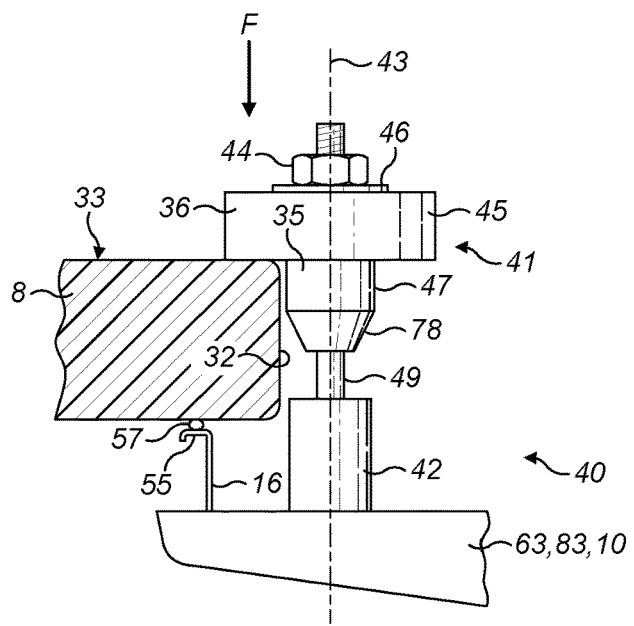
FIG. 8 shows a schematic illustration of a fixing element according to aspects of the invention.
Figure 9A:
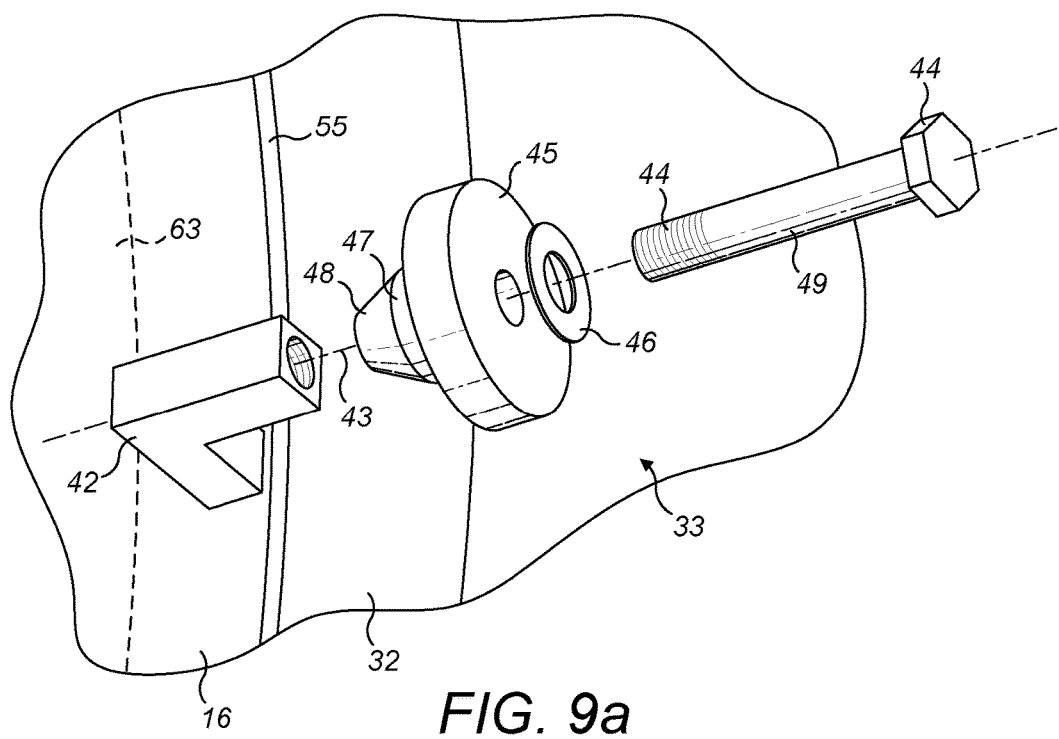
FIGS. 9*a* and 9*b* show a schematic illustration of further aspects of a fixing element according to aspects of the invention.
Figure 9B:
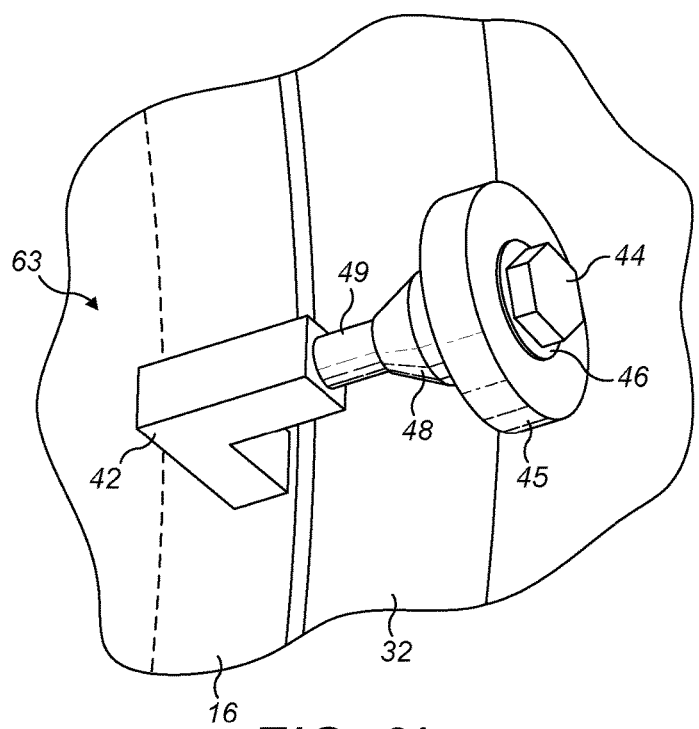

The particular design of the fixing elements 40 which are illustrated by way of example as axial clamps 41 will be discussed with reference to FIGS. 8, 9a and 9b. An axial clamp 41 comprises an anchor 42, which in this case is shown in the form of a boss which is fixed or welded to the access panel 10 or cover panel 83, 63 thereof. In some embodiments, the anchor 42 may be provided at the side wall 16 or 15 of a main- or sub-panel 60, 80. A clamp head 45 is shown optionally having a narrow waist 35 and a flared claw 36. A shank 49 has a main axis 43 which may be parallel to a closure axis in relation to the access panel 10 or aperture 7. The shank 49 connects the clamp head 45 and the anchor 42 via an adjustment actuator 44 and a shim 46. In embodiments, the shank 49 may be in the form of a threaded bolt. In the embodiment illustrated, the axial clamp 41 thereby optionally comprises a clamp force adjuster 44, a threaded part of which is also the main shank 49 of the axial clamp 41. In the case illustrated, the clamp force adjuster 44 comprises a threaded shaft and a nut. In the case illustrated, actuation of the clamp force adjuster 44 has the dual effect of applying a clamping force via the claw portion 36 and adjusting the effective length of the main shank 49. The clamp head 45 is preferably made of a resilient, elastically deformable material which is deformable under clamping forces applied by manually tightening of the axial clamp 41. The clamp head 45 preferably has a smooth surface and has sufficiently low hardness and sufficient elasticity such that it is not susceptible to scratch or damage a coating on the surface of the tower wall 8. The waist 35 presents an axially extending alignment surface 47 which serves to radially position the access panel 10 against an edge face 32 of the service aperture 7.

Advantageously, the clamp head 45 further comprises an axially tapered surface 48 adjacent and extending radially inward of the alignment surface 47. Thus when the clamp head 45 is drawn axially along the shank 49 towards the anchor 42 in which the shank 49 is held, the tapered surface 48 engages with the inner rim 9 of the tower wall aperture 7 and is caused to slide over it while at the same time pushing the access panel 10 into its intended position. The clamp head preferably exhibits rotational symmetry about its main axis 43 which coincides with a main longitudinal axis of a clamp shank 49.

In operation, a clamping face of the claw 36 abuts against the interior surface 33 of the tower wall 8. The force adjuster 44 may be actuated by tightening it to put the shank 49 under tension and transmit a claiming force 'F' to an interior surface 33 of the tower wall aperture region. The claw 36 thereby serves to pull the access panel 10 securely to abut and rest against the outside surface 31 of the tower wall 8. A sealing bead 57 at the access panel 10 side wall 16 may provide an improved weather proof connection of the access panel 10 when it is fixed and secured in position.

According to aspects of the invention, fixing elements 40 enable the access panel 10 to be secured in place at the aperture 7 preferably without requiring holes to be drilled in the tower wall 8 or welds to be applied thereto. Advantageously therefore, in a tower 2 according to aspects of the invention, there may be no structural welds on the tower wall 8 or no large welds or no welds of any kind.

During use, when installing an access panel 10 according to the invention at the service aperture 7 of a wind turbine tower 2, a bearing surface 86 is pre-established in the aperture 7 by positioning a sub-panel 80 of the access panel 10 such that its bearing surface 86 adopts a predetermined and fixed bearing position in the aperture 7. This operation can be carried out using relatively modest equipment or tools because the dimensions of the sub-panel 80 may be relatively manageable. In most instances, a sub-panel may be expected not to exceed a maximum dimension of about 1 or 2 meters across. If made of a lightweight material such as aluminium, it may be light enough to be handled into position at a tower wall aperture 7 by one or two service personnel. Adjustments to its portion can also be carried out manually using hand held tools and by one or two members of service personnel. Also a fixing operation of the sub-panel 80, once its bearing surface has adopted the predetermined desired relative position in the aperture 7, preferably using fixing elements such as axial clamps 41 described herein, may be carried out by one or two service personnel and hand held tools. A reasonably precise positioning of the sub-panel may be of importance in ensuring a durable and weatherproof fit of the access panel 10 over a service aperture 7. Moreover, in embodiments in which an auxiliary door 90 is provided encompassed in the access panel 10, there is a need for the access panel 10 to be robustly held in position in order to sustain physical usage of the door 90 repeatedly over time. For fixing the sub-panel in position, any appropriate fixing means 40 may be contemplated, including quick-fasteners such as hinged lever type sprung fasteners, latching dogs or other suitable types of clasp or clamp.

Once the sub-panel 80 is securely in position, the much larger main panel 60 may be more swiftly brought into position. Given its considerably larger size and greater weight, the main panel 60 is expected to be suspended from a crane (not shown) by a hoisting point 19 during installation. The size of the main panel 60 makes it not only heavy but susceptible to be caught by gusts of wind making bringing it into position in the aperture 7 particularly difficult, especially under windy conditions. While suspended from the crane, its reference surface 66 may be easily abutted against the bearing surface 86 of the sub-panel 80. The predetermined adjusted position of the bearing surface 86 is measured to take account of the respective, know dimensions of the aperture 7 and of the main panel 60. When the reference surface 66 abuts the bearing surface, a previously determined acceptable fit of the main panel 60 and thereby of the access panel 10 as a whole at the aperture 7 is easily guaranteed without further operations or adjustments. In aspects of the invention, the reference surface 66 and the bearing surface 86 may be configured to mutually interlock such as in a tongue- and groove type arrangement which adds to the effectiveness of the operation of fittingly connecting the two elements. After positioning the main panel 60, it can be fixed using any suitable fixing elements 40 as discussed in relation to the sub-panel and examples of which are described or defined herein. The axial clamps 41 specifically described herein may provide an additional measure to enhance the fit of the main panel 60 and access panel 10 as a whole, such as an axially tapered portion of a surface which abuts a service aperture wall edge surface 32.

When moving large components such as a transformer or other pieces of equipment though the tower wall service aperture 7, the aperture 7 can be opened by removing the main panel 60 of the access panel using a crane as described previously, while leaving the sub-panel 80 in place. After completing moving of large components, the aperture 7 may be swiftly closed again without requiring alignment in relation to the aperture 7 because the bearing surface 86 of the sub-panel 80 provides the requisite guidance into position. The access panel 10 according to the invention is thereby easier to install and easier to operate when needed.

As described herein, additional aspects of the invention include a set of fixing elements at an access panel which fixing elements 40 allow the access panel to be fixed in place, secured, and operated when the access panel 10 is required to be removed, all without weakening the tower wall 8 and without damaging weatherproof coatings thereon. Thereby, the tower access aperture 7 may be configured without a structural aperture frame—in other words, the tower aperture 7 may have a non-structural aperture frame. Similarly, the access panel 10 according to aspects of the invention may preferably be non-structural in relation to the tower 2.

As will be appreciated, in some aspects presented herein, the access panel 10 of the present invention may be suitable for implementation in outdoor structures other than wind turbines and into which access is occasionally required for personnel or equipment and in which fitting of the access panel or provision of a wall aperture may present similar challenges to those described herein in the context of wind turbine towers.

The invention claimed is:

1. Access panel configured for fixing to a service aperture in a wind turbine tower wall;
    said access panel being generally planar;
    wherein said access panel comprises a main panel and an adjacent sub-panel positioned below said main panel, the main panel having an auxiliary door dimensioned to allow passage of service personnel therethrough;
    said sub-panel comprising a bearing surface at an edge thereof;
    said main panel comprising a reference surface at an edge thereof;
    said main panel and said sub-panel being connectable in abutment along a common seam;
    said seam comprising a said sub-panel bearing surface and a said main panel reference surface;
    said main panel being dimensioned to close a main region of a said aperture whereas said sub-panel is dimensioned to close a first sub-region of said aperture, adjacent said main region,
    wherein said sub-panel is adjustable to selectively position the bearing surface so as to form the abutment along the common seam.

2. The access panel according to claim 1, wherein said auxiliary door is fully encompassed within said main panel or within a single sub-panel thereof.

3. The access panel according to claim 1, wherein said sub-panel of said access panel comprises one or more radial locators which locators provide radial adjustment between said sub-panel and a said tower wall aperture to thereby allow positional adjustment of said bearing surface in relation to said aperture.

4. The access panel according to claim 3, wherein said one or more radial locator comprises an anchor fixed to said sub-panel, a separation adjuster and a foot.

5. The access panel according to claim 4, wherein said separation adjuster includes a shank positioned between said anchor and said foot, said distance adjuster being capable of varying the separation between said sub-panel and said tower wall aperture.

6. The access panel according to claim 1, wherein said access panel comprises a set of fixing elements configured to securely fix said panel in place at a said tower wall aperture.

7. The access panel according to claim 6, wherein each said fixing element comprises an axial clamp, each clamp comprising an anchor fixed to said access panel, a clamping force adjuster and a resilient clamp head.

8. The access panel according to claim 7, wherein said resilient clamp head is axially adjustable in relation to said anchor.

9. The access panel according to claim 8, wherein said clamp head includes an axially tapered surface.

10. A wind turbine tower having a generally cylindrical wall;
    said tower defining an interior region within said wall and an exterior outwith said wall;
    said tower wall being provided with a service aperture, which aperture extends radially about an aperture main axis and which aperture is dimensioned to allow passage of personnel and equipment between said exterior and said interior region;

wherein said tower further comprises the access panel according to claim 1 removably fixed at said tower aperture.

11. The wind turbine tower according to claim 10, wherein said access panel is fixed to said tower wall aperture by means of fixing elements at said access panel without requiring welds between said access panel fixing elements and said tower wall.

* * * * *